Figure 1:
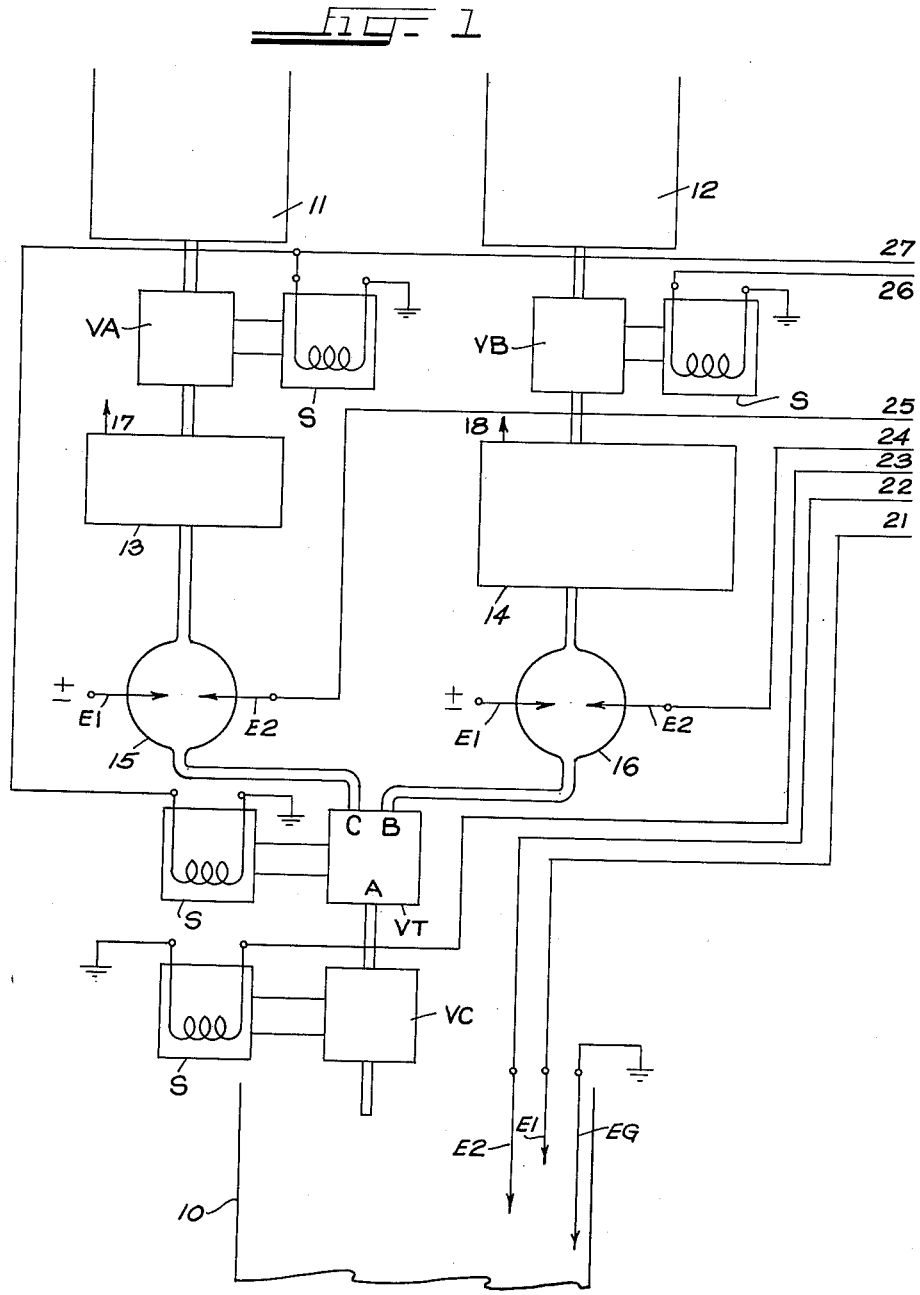

July 17, 1962  A. A. EISENBRAUN  3,045,026
SEPARATION OF AMINO ACIDS BY ION EXCLUSION
Filed May 6, 1959  3 Sheets-Sheet 1

INVENTOR.
ALLAN A. EISENBRAUN

July 17, 1962   A. A. EISENBRAUN   3,045,026
SEPARATION OF AMINO ACIDS BY ION EXCLUSION
Filed May 6, 1959   3 Sheets-Sheet 2

INVENTOR.
ALLAN A. EISENBRAUN
BY
Kegan, Bellamy & Kegan
ATTYS.

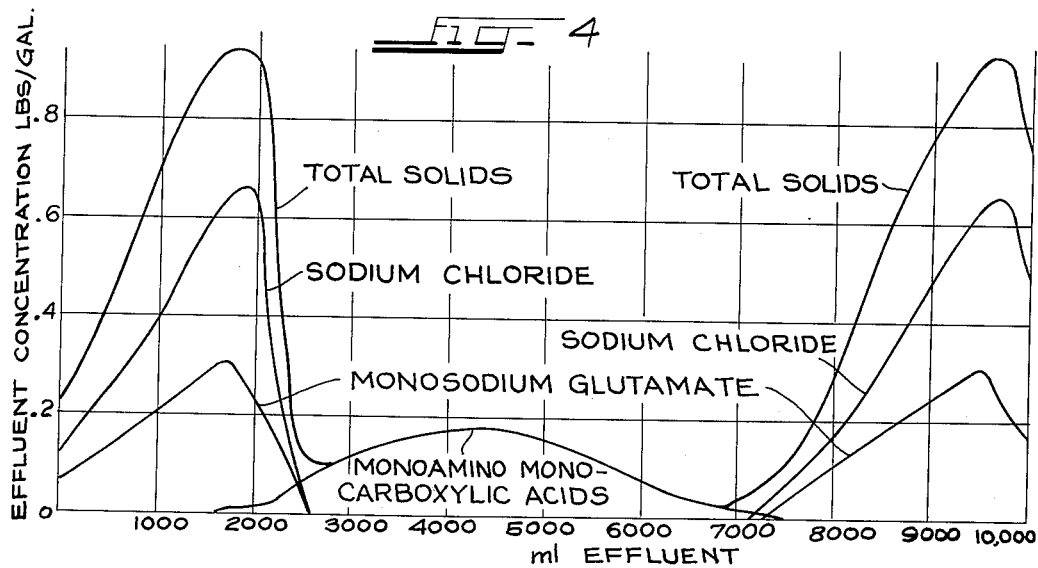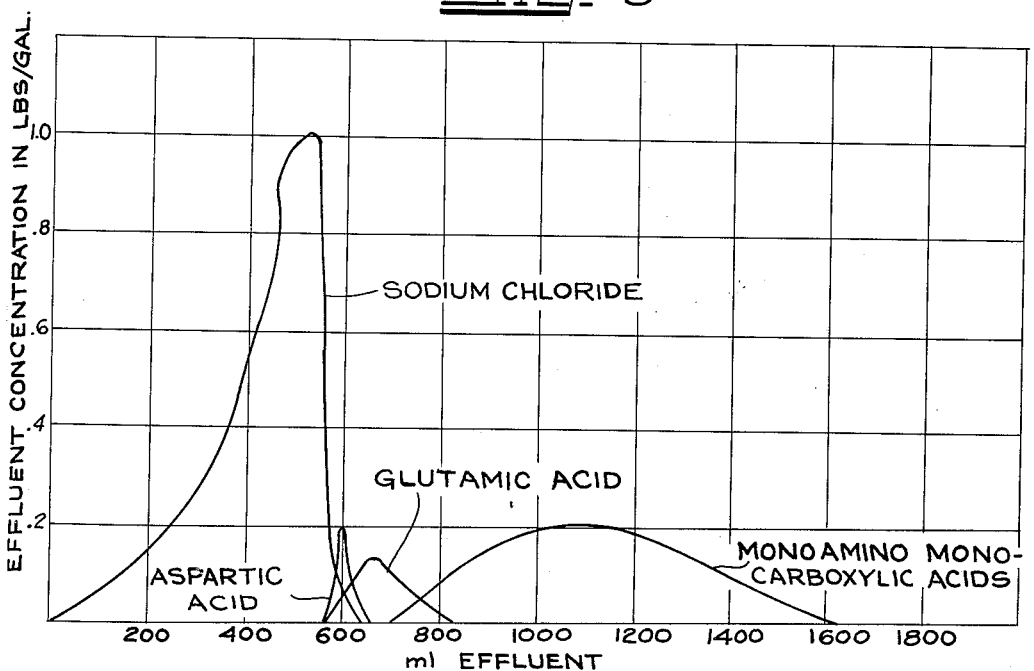

United States Patent Office 3,045,026
Patented July 17, 1962

3,045,026
SEPARATION OF AMINO ACIDS BY
ION EXCLUSION
Allan Alfred Eisenbraun, Montreal, Quebec, Canada, assignor to Ogilvie Flour Mills Company, Limited, Montreal, Quebec, Canada, a corporation of Canada
Filed May 6, 1959, Ser. No. 811,473
4 Claims. (Cl. 260—326.3)

The instant invention relates to methods and apparatus for recovery of amino acids from protein hydrolysates, hydrolysate end liquors, recycle liquors and the like. More particularly it relates to the separation of dicarboxylic amino acids such as glutamic acid, from monoaminomonocarboxylic acids by an ion exclusion separation.

Amino acid recovery processes such as recovery of glutamic acid from protein hydrolysates usually involve a plurality of separation steps and involve substantial loss in glutamic acid in the end liquors and the precipitates of impurities separated from the hydrolysate. Attempts have been made to recover glutamic acid from hydrolysates and end liquors by ion exchange methods; however these processes have not proved satisfactory for large scale operations. Ion exchange is a relatively expensive operation, and many difficulties arise in the separation because of the various impurities in the solution.

A recent development in the use of ion exchange materials is known as ion exclusion. An ion exclusion process is described and claimed by W. C. Bauman in U.S. 2,684,331 issued July 20, 1954. In this process two or more substances having widely different ionization constants, and in which at least one of the substances undergoes considerable ionization in dilute aqueous solution, are separated by passing through a bed of ion exchange resin in the same form as the ionic fraction. The components appear in successive effluent fractions when wash water is passed through the bed.

If an ion exclusion method could be devised to separate amino acids from hydrolysates, hydrolysate fractions, or similar aqueous solutions containing amino acids, such a method should provide a substantial improvement in yield of amino acids and be simpler and lower in cost than conventional methods, especially as compared to ion exchange methods where regeneration of the exchange resin is necessary.

It is therefore an object of the instant invention to provide an improved method involving an ion exclusion separation step for the recovery of amino acids from protein hydrolysates, fractions thereof, and other solutions containing amino acids.

It is a further object of the instant invention to provide an ion exclusion method for the recovery of glutamic acid, aspartic acid, proline, and other amino acids from protein hydrolysates, and fractions thereof containing them.

It is a further object of the instant invention to provide a method for separation from protein hydrolysates of at least one fraction containing a major portion of proline and at least one glutamic acid-containing fraction.

It is a further object of the instant invention to provide a glutamic acid recovery process of improved efficiency and yield.

It is a further object of the instant invention to provide apparatus for the separation of amino acids from protein hydrolysates, hydrolysate fractions, end liquors, recycle liquors, and the like.

These and other objects of the instant invention will become more apparent from the following description and claims.

I have discovered that an ion exclusion method can be used to separate amino acids from protein hydrolysates, hydrolysate fractions and similar aqueous solutions when the pH of the hydrolysate and other conditions are controlled as hereinafter described. An apparatus for carrying out the separation of the amino acids is also provided.

In practicing the ion exclusion separation step, a bed of exchange resin is contacted with the hydrolysate or other amino acid-containing solution at a pH at which the glutamic acid and aspartic acid present therein are in relatively highly ionized form and the monoaminomonocarboxylic acids are less extensively ionized.

To begin the operation a bed or column of the granular ion exchange resin is covered with water, and then the aqueous amino acid-containing solution is fed to the bed to displace an equal volume of water therefrom. The flow of liquid through the bed may be in any direction, but is preferably downward.

Upon contact with the resin, part of the monoaminomonocarboxylic acids enters the liquid inside the resin particles, while the monometal salts of the dicarboxylic acids are not believed to make such a penetration. The latter are flushed from the resin bed first upon elution with water, while additional water washes the less ionized solutes from the bed.

There is a significant difference in the rates at which the strongly and weakly ionized compounds are washed from the resin. A comparatively strongly ionized solute is washed from the bed substantially faster than weakly or nonionized solutes. By fractionation of the effluent from the bed, a separation of solutes is achieved.

Figure 3:
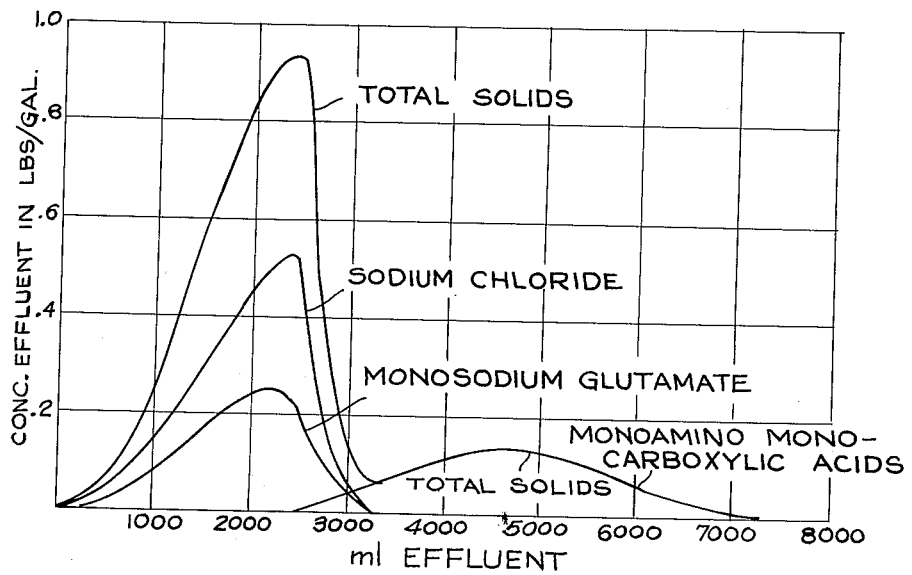

The degree of ionization of the various amino acid constituents of protein hydrolysates or fractions thereof vary depending upon the pH of the solution. The ion exclusion separation of the amino acids naturally present in hydrolysates and other solutions is not the same at every pH. For example, when the ion exclusion separation is carried out on a solution having a pH between about 4 and about 9.5 FIGURES 3 and 4 show that a mixture of glutamic acid, aspartic acid and sodium chloride is separated from the monoaminomonocarboxylic acids. On the other hand, at a pH between about 2 and about 4 it can be seen in FIGURE 5 glutamic acid and aspartic acid are partly separated from each other as well as from sodium chloride and monoaminomonocarboxylic acids in the solution.

Thus by adjustment of the pH of the solution to be subjected to the instant ion exclusion separation, the type of separation of monoaminomonocarboxylic acids from the dicarboxylic amino acids is controlled.

In a typical embodiment of the instant invention, the sodium form of a cation exchange resin of the sulfonic acid type (Dowex 50×8) is covered with water in a column. The amino acid-containing feed solution to be separated is a filtered, neutral wheat gluten hydrolysate. The feed solution is admitted at the top of the column and is followed by water.

The first portion of effluent, that is, the water initially in the column covering the resin is discarded. The following effluent is generally collected in fractions. The first fractions collected contain the glutamic acid and/or aspartic acid present in the hydrolysate feed. There is a substantial amount of sodium chloride in this glutamic acid containing fraction as the protein hydrolysate used as feed contained a considerable portion of this salt. Sodium chloride is easily separated by concentrating the effluent and removing the crystallized salt by filtration.

The subsequent fractions of effluent contain the monoaminomonocarboxylic acids, i.e., proline, threonine, glycine, serine, alanine, leucine, and isoleucine.

When the process is carried out continuously for example in a timer or level control system by alternately feeding hydrolysate and water to the column, alternate fractions of dicarboxylic amino acids, monoaminomonocarboxylic acids are separated.

Figure 2:
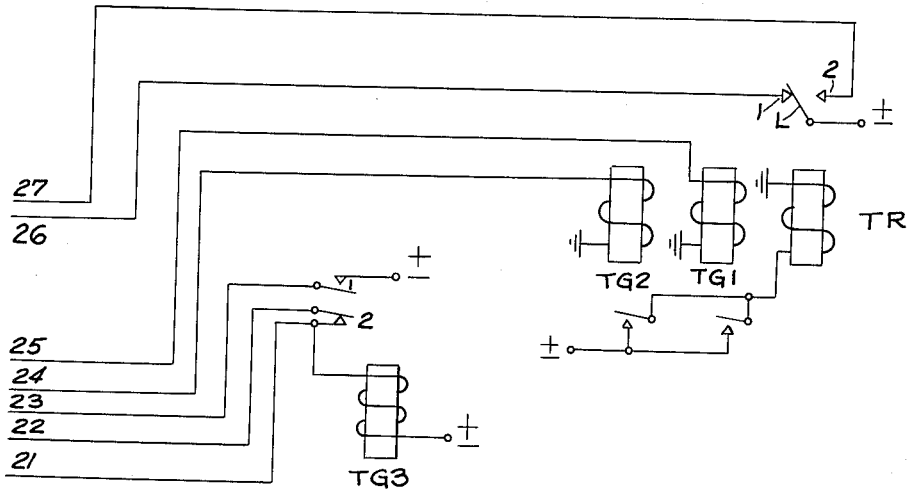

The above-mentioned and other features of this invention will become more apparent by reference to the following description of an embodiment of the invention taken in conjunction with the accompanying drawings, comprising FIGS. 1 to 5, wherein:

FIG. 1 somewhat schematically illustrates cyclic apparatus suitable for carrying out the invention;

FIG. 2 illustrates schematically electrical circuit apparatus for controlling valving operations in the apparatus of FIG. 1; and FIGS. 3 to 5 graphically illustrate the composition of successive fractions of the effluent liquor collected during one or more cycles of operation in accordance with various embodiments of the invention. Determinations were made for each 250 ml. effluent in FIGURES 3 and 4 and for each 20 ml. effluent in FIGURE 5. These drawings will be referred to in greater detail in the specific examples.

The ion exclusion step is carried out in an elongated resin-filled column or tank 10, only the top of which is shown in FIGURE 1. The liquid input to column 10 is from storage tanks 13 and 14 by way of solenoid-actuated valves VT and VC. Valve VC is closed except when opened by energization of its solenoid S. Valve VT has its discharge port A in communication with its inlet port C except its solenoid S is energized to place its port A in communication with its port B.

Closed storage tanks 13 and 14 are supplied from liquid sources, or tanks, 11 and 12 by way of valves VA and VB, each of which is closed except when its solenoid S is energized. Each of the tanks 13 and 14 has a vent 17 and 18 respectively preferably arranged to readily admit air when the tank is being drained but to preclude liquid from flowing out through the vent when the tank is filled. The supply liquid at 11 is the feed solution and the water tank is 12.

The control of the apparatus of FIG. 1 is from the apparatus of FIG. 2 over conductors 21 to 27, by relays TG1, TG2 and TG3 and toggle relay TR. All of these relays are electromagnetic devices arranged to be operated from alternating current, as are the solenoids S of the valves of FIG. 1. The source of alternating current is assumed to have one terminal grounded as indicated by the ground symbols appearing in FIGS. 1 and 2, and to have at least one free terminal and having a positive and negative alternating-current potential to ground as indicated by the plus and minus symbols appearing at certain terminals.

In operation, each of the tanks 13 and 14 fills comparatively quickly when its associated supply valve opens, but drains comparatively slowly into column 10 when the supply valve is closed and the succeeding valves are set for draining the tank into column 10. The discharge from tanks 13 and 14 is by way of an individual tube or pipe, each containing a separate pair of electrodes E1 and E2. The electrodes are illustrated as being contained within bulb enlargements 15 and 16.

In the drawings, relays TG1 to TG3 are each illustrated in energized condition. Relay TG3 is held operated through electrodes E1 and E2 of 10 or locked operated through its contacts 2 and electrodes E1 and E2 of column 10. Electrode EG is grounded. Contacts 1 of TG3 maintain the winding of solenoid S of VC disconnected and deenergized. Relays TG1 and TG2 are maintained operated through the electrodes E1 and E2 of the respective bulbs 15 and 16 and the liquid therein. Being operated, relays TG1 and TG2 maintain the winding circuit of toggle relay TR open. Toggle relay TR is so arranged that, when an energization of its winding occurs, it transfers its lever L from the engaged one of the contacts 1 and 2 to the other one. As illustrated, TR is maintaining a circuit through its member L and its contact 1 for the winding of solenoids S of valve VB, whereby that valve is held open to fill tank 14. With valve VC being maintained closed (by the deenergized condition of the winding of its solenoid S) with relay TG3 operated, no liquid can be drained from either of the tanks 13 and 14, and they both remain filled for the time being.

When the level of column 10 is lowered by collecting effluent at the bottom of column 10, the liquid level falls in column 10 below the electrode E2, relay TG is unlocked and restored, opening its contacts 2 and closing its contacts 1. Solenoid valve VC is now opened by the energization of the winding of its solenoid S, admitting liquid into column 10 from tank 13 through the open valve VC, and through ports C and A of VT. The contents of tank 13 accordingly drain into column 10, valve VA being closed at the time.

When tank 13 is drained, contact is broken between the electrodes E1 and E2 of 15, open-circuiting and restoring relay TG1. Toggle relay TR is thereupon energized to transfer its member L from its contact 1 to contact 2, thereby acting through the illustrated solenoids to close valve VB and open valve VA. Valve VA quickly refills tank 13, and valve VB prevents further flow into tank 14 for the time being.

The solenoid of valve VT is now energized in parallel with the solenoid of valve VA, transferring its port A from port C into communication with port B, permitting tank 14 to drain into column 10.

As the filling of tank 13 begins, liquid again appears at 15, reconnecting the electrodes thereof and thereupon reoperating relay TG1 to deenergize the winding of toggle relay TR, but without interfering with the positioning of its lever L.

When the draining of tank 14 is eventually accomplished, the liquid contact is consequently broken between the electrodes of bulb 16, deenergizing relay TG2 to again energize TR. Lever L of TR is consequently transferred back to the position shown in the drawing, again energizing and opening valve VB and deenergizing the solenoids of valves VA and VT. Valve VA is thereby caused to close, and valve VT is caused to transfer its outlet port A back into communication with its inlet port C to again drain tank 13.

When tank 14 starts to fill, relay TG1 is again operated through the electrodes at 16, again deenergizing the winding of TR.

The foregoing operations continue cyclically so long as valve VC remains open, which occurs so long as relay TG3 remains restored.

The tanks 13 and 14 generally have the indicated different capacities which accord with the desired proportions of the two liquids used to fill column 10.

As the liquid rises in column 10 it first connects grounded electrode EG to E2, but that does not immediately affect TG3 because its locking contacts 2 are then open. But, when the liquid rises until E1 of column 10 is encountered, relay TG is operated, thereby locking itself to electrode E2 of 10 at its contacts 2, and deenergizing the solenoid of valve VC at its contacts 1. Valve VC thereupon closes and prevents any further draining of tank 13 or 14 for the time being. When this occurs, the cyclic operations described of relays TG1 and TG2 and relay TR terminate with bulbs 15 and 16 both filled and with relays TG1 and TG2 both energized, maintaining toggle relay TR deenergized and leaving its lever L in engagement with its associated contact 1, as illustrated. The apparatus remains in this condition until the column 10 is again drained below electrode E2, whereupon a repetition of the described alternate filling operations occurs. Using this apparatus, the ion exclusion separation step can be carried out continuously and automatically.

The preferred resin for packing column 10 in separating the amino acids is the sodium form of a sulfonic acid cation exchange resin, such as Dowex 50, 8% cross linked (Dowex 50×8). However, any highly ionized exchange resin in its neutral form, such as a metal or ammonia salt of a carboxylic type cation exchange resin, or an acid salt of an anionic exchange resin, which is non-reactive with the components of the feed solution, may be employed. The resins are used without regenerants which reduces the cost of the process considerably compared to conventional ion exchange processes.

The term Dowex 50 ion exchange resin is somewhat generic and applies to a family of cross linked sulfonated polystyrene resins of varying cross linking. Particle size of the resin can also be varied. In practicing the instant invention, the resin is generally between about 50 and about 100 mesh size and of between about 4% and 8% cross linkage. (Dowex 50×4% and Dowex 50×8%.)

The best separations are obtained using a relatively small feed volume, compared to the solvent volume in the resin particles in the total bed or column 10, and the amount of water used to wash the bed should be substantially greater than the feed volume. A preferred ratio of feed and water is approximately 1:4. The flow rate may be from .05 to about 2 gallons per square foot per minute. A discussion of the general relationship between volume and rate of flow for ion exclusion processes is given by R. M. Wheaton and W. C. Bauman, "A Unit Operation Utilizing Ion Exchange Materials," Ind. and Engr. Chem. 45, 228, 1953.

The process may be carried out at temperatures between that at which the amino acid solution congeals and its boiling point. Generally, the extent of separation is greater as the temperature of the solution is increased. However, more control may be necessary at elevated temperatures because of eddy currents. It therefore is generally preferable to carry out the process at about room temperature.

The degree of separation becomes greater with decrease in the concentration of glutamic acid in acid solutions or monosodium glutamate in neutral amino acid solutions. With a feed solution at about a neutral pH, the best separation of glutamic acid from the monoaminomonocarboxylic acids is obtained at a concentration between about 30 and about 100 grams per liter. However, separations are possible from 3 to 200 grams per liter. When the separation is carried out at a pH between 2 and 4, the concentration of glutamic acid is limited by its solubility in the feed solution, that is, the concentration is no higher than about 50 grams per liter. The concentration of the nonionized solutes have little effect on the efficiency of the separation.

The instant invention is applicable to protein hydrolysates, such as hydrolysates of wheat gluten, corn gluten, soy protein, concentrated Steffen's filtrate, and the like, and to end liquors and recycle liquors of glutamic acid recovery processes derived from said hydrolysates.

The above liquors are generally neutralized and filtered prior to feeding to the bed of resin. Specific examples of hydrolysate fractions suitable for introducing into the instant ion exclusion separation step are hydrolysates from which humin has been precipitated and separated and hydrolysates from which humin and then a tyrosine-leucine cake has been precipitated and separated in any one of the conventional methods. Recycle liquors of glutamic acid recovery processes are also subjected to ion exclusion in the same manner; for example, repulp liquors from the conventional step in which humin or in which the tyrosine-leucine are separated or a combination of these repulp liquors are subjected to ion exclusion separation. Subjecting these repulp liquors to ion exclusion as described herein would result in substantial increase in yield and efficiency of glutamic acid recovery processes.

In order to more specifically illustrate the operation of the instant invention, but with no intention to be limited to the specific details, the following examples are given.

*Example I*

A column having a length of 153 cm. and a diameter of 9.4 cm. was filled with the sodium form of a sulfonated styrene-divinylbenzene copolymer (Dowex 50×8%) of between 50 and 100 mesh size. The column was filled with water. Then 400 ml. gluten hydrolysate (containing 429 gm./liter solids, 176.7 gm./liter sodium chloride, and 98.5 gm./liter monosodium glutamate) which had been adjusted to a pH of 7.2 with sodium hydroxide and diluted with water to a volume of 1200 ml. was fed slowly to the top of the column. The bottom valve of the column had been adjusted for an effluent flow rate of 110 ml. per minute. The first 3500 ml. of effluent was free of sodium chloride and amino acids. The subsequent effluent was collected in 34 fractions of 250 ml. each.

Upon contact of the feed with the resin in the column, a part of the monoaminomonocarboxylic acids enters the liquid inside the resin particles, while the monosodium salts of the dicarboxylic acids do not make said penetration and remain in the surrounding liquid. The dicarboxylic acids were flushed from the column by the inflow of additional water at the top of the column. As the flow of water continued, the monoaminomonocarboxylic, which had penetrated the resin were washed from the column.

The effluent fractions were analyzed as follows: for sodium chloride, by potentiometric titration with silver nitrate; total solids, by evaporation to dryness; monosodium glutamate, by the enzymatic Warburg method described by Murray Seidman and Morris J. Blish, "Agricultural and Feed Chemistry," vol. 5, 448, 1957; and the monoaminomonocarboxylic acids by paper chromatography. A dried No. 1 Whatman paper, pretreated with 3 M disodium phosphate solution was used as the stationary phase. The eluant was a mixture of 70 parts phenol, 20 parts water, and 5 parts isopropanol. Ninhydrin solution was used as developer. The amino acid concentration was estimated by the color formed upon developing the chromatograms with ninhydrin solution using amino acids of known concentration as the standards.

FIGURE 3 shows the changes in concentration of monosodium glutamate, sodium chloride, monoaminomonocarboxylic acids, and total solids in the effluent.

In this figure, from 3500 ml. to 8000 ml. the total solids curve and the monoaminomonocarboxylic acids curve coincide.

Effluent fractions obtained upon separation of neutral hydrolysate contained monosodium glutamate, monosodium aspartate, and sodium chloride. This effluent can be spray dried to obtain a mixture, useful as a seasoning agent; or alternately, the solution can be evaporated, the sodium chloride separated, and glutamic acid crystallized from the concentrated solution at a pH of about 3.2.

*Example II*

The separation of amino acids in wheat gluten hydrolysate was carried out on a continuous basis in apparatus as shown in FIGURE 1 which had for feed and eluant regulation a fully automatic electric device which gave constant volumes of feed and eluant for each cycle. The stainless steel column was filled with the sodium salt of a sulfonic acid cation exchange resin (Dowex 50×8), and this resin bed was covered with water. This liquid-covered bed had a length of 142 cm. and a diameter of 10.8 cm.

The feed for each cycle was 595 ml. of filtered, neutral wheat gluten (pH 7.2), diluted with water to 1485 ml. The volume of water to wash the amino acids from the column was 6400 ml. per cycle. The column was run on a continuous basis for 50 cycles, at a flow rate of 170 ml. per minute, and then representative portions of the effluent were collected in fractions of 250 ml. each. These fractions were analyzed as described in Example I, and the concentration of the amino acids in the effluent is shown in FIGURE 4. In this figure, between about 2700 ml. and 6900 ml., the total solids curve and the monoaminomonocarboxylic acids curve coincide. The alternate collection of monosodium glutamate containing fractions and monoaminomonocarboxylic acid fractions continued in a regular pattern for the 50 cycles without exhaustion nor decrease in efficiency of the resin bed.

*Example III*

Separation of the amino acids in 7425 ml. of dilute, filtered, neutral gluten hydrolysate (containing .281 lb./gal. glutamic acid) was carried out in the apparatus and using the method described in Example II. The conductivity of the effluent from the column was measured on a continuous basis, and portions of the effluent of conductivity higher than 2000 micro-siemens and lower than 2000 micro-siemens, were collected separately.

The effluent fraction of conductivity higher than 2000 micro-siemens was evaporated under reduced pressure to 500 ml., and the sodium chloride which crystallized during the evaporation was removed by filtration. The resulting concentrated solution was acidified with hydrochloric acid to a pH 3.1, and the mixture allowed to crystallize at 3° C. The crude glutamic acid was separated by filtration and purified by repulping with water and drying in vacuo. The product weighed 210.3 gm., and the purity was 94% as determined by titration with .2 N sodium hydroxide and by the enzymatic Warburg method.

This represented a recovery of 95% of the glutamic acid in the hydrolysate as compared to the usual commercial methods in which the yield at this stage is about 70%.

The effluent from the column of less than 2000 microsiemens conductivity was evaporated under reduced pressure to 40% solids. A crystalline mixture of leucine, isoleucine, methionine, tyrosine, and cystine was separated during the evaporation, and they were removed by filtration. The resulting liquor was evaporated to dryness, and analysis of the resulting mixture by paper chromatography showed the following: serine, 10%; glycine, 9%; proline, 52%; threonine, 5%; alanine, 5%; leucine, 5%; and isoleucine, 7%.

The above proline fraction is useful for addition to animal feeds and as a nutrient medium in the production of fermentation chemicals. Proline may also be separated from this fraction to obtain the purified compound.

*Example IV*

A column, 128 cm. in length with a diameter of 3.6 cm. was filled with the sodium form of a sulfonic acid cation exchanger (Dowex 50×4%), and was washed with 2000 ml. of 2% acetic acid, followed by 2000 ml. water. Into the column was introduced 200 ml. of diluted glutamic acid end liquor at the rate of 15 ml. per minute. Eighty milliliters of the end liquor which contained 262 gm. per liter sodium chloride, 28 gm. per liter glutamic acid, and 15 gm. per liter aspartic acid had been adjusted to a pH 2.65 and diluted to 200 ml. The column was then washed with water. The first 420 ml. effluent was discarded. The subsequent effluent was collected in 49 fractions of 33 ml. each, and the individual fractions were analyzed.

FIGURE 5 shows that glutamic acid can be separated from end liquors from conventional type glutamic acid recovery processes. The effluent fractions containing almost pure glutamic acid may be concentrated by evaporation under reduced pressure, and the glutamic acid crystallized in the conventional manner.

In commercial operations, it is not unusual to produce about 1800 gallons of glutamic acid end liquor daily. By the instant invention, about 650 pounds monosodium glutamate and 390 pounds monosodium aspartate could be recovered daily from the end liquors.

In summary, the instant invention represents a simple and efficient method for increasing the commercial yield of glutamic acid from protein hydrolysates liquors or fractions thereof. It further represents a more economical method for separation from hydrolysates and hydrolysate liquors of glutamic acid and monoaminomonocarboxylic acids substantially free from contaminating inorganic materials, such as sodium chloride and calcium sulfate. These inorganic salts are generally present in neutralized protein hydrolysates and are usually difficult to separate from the monoaminomonocarboxylic acids. The instant method also provides a method for the recovery from hydrolysates of a fraction high in proline.

Having thus fully described and illustrated the character of the instant invention, what is desired protected by Letters Patent is:

1. A method for separating glutamic acid and a mixture of monoaminomonocarboxylic acids comprising proline, serine, glycine, threonine, alanine, leucine, isoleucine, methionine, tyrosine, and cystine, from protein hydrolysate liquors and fractions thereof from which humin, tyrosine and leucine have been removed which comprises adjusting the pH of said amino acid-containing solution to about neutrality and to a concentration between about 1% and about 35% by weight of solids; feeding the adjusted solution to a water-immersed bed of the sodium form of a 4 to 8% cross linked sulfonated polystyrene resin, the volume of said solution being less than the volume of water initially adsorbed in the resin, and thereby displacing water from the resin bed; thereafter feeding water to the bed in volume about four times the volume of said amino acid solution; and collecting a plurality of fractions containing glutamic acid followed by a plurality of subsequent fractions containing a mixture of said monoaminomonocarboxylic acids.

2. A method for recovering a glutamic acid fraction and a proline fraction from wheat gluten hydrolysate, fractions thereof and recycle liquors derived therefrom, which comprises feeding neutral hydrolysate solution from which precipitates of humin and of tyrosine-leucine have been separated to a bed of water-covered sulfonated polystyrene resin in its sodium form and of between about 4% and 8% cross linkage, thereby displacing water from said resin; feeding sufficient water to said bed to wash the hydrolysate from said bed; collecting at least one fraction containing glutamic acid followed by subsequent fractions containing other amino acids, evaporating said subsequent fractions to about 40% solids by weight, and separating insoluble material from the liquid product which comprises proline along with minor amounts of serine, glycine, threonine, alanine, leucine, and isoleucine.

3. A continuous process for recovering glutamic acid and a proline-containing fraction from protein hydrolysates, from which humin, tyrosine, and leucine precipitates have been removed, which comprises: adjusting the pH of said hydrolysate to about 7 and its concentration to between about 1% and about 35% by weight solids content; continuously and alternately feeding the resulting hydrolysate fraction and water to a bed of water-immersed sulfonated polystyrene resin in its sodium form, in a volume ratio of water to hydrolysate fraction of about 4:1; alternately collecting separate effluent fractions of water, then of glutamic acid, followed by those containing proline along with small amounts of serine, glycine, threonine, alanine, leucine, isoleucine, methionine, tyrosine, and cystine; evaporating the glutamic acid fractions and separating crystallized sodium chloride therefrom; acidifying the resulting solution with hydrochloric acid to a pH of about 3.1; and separating glutamic acid from the adjusted liquor.

4. A method for separating additional amounts of glutamic acid from end liquors obtained in conventional processes for the recovery of glutamic acid from protein hydrolysates which comprises: adjusting the pH of the glutamic acid end liquor to 2.6; feeding said adjusted end liquor to a bed of water-immersed sulfonic acid cation exchanger in the sodium form, thereby displacing water from said resin; feeding sufficient water to said bed to wash glutamic acid from the bed; and collecting an effluent fraction containing substantially pure glutamic acid.

References Cited in the file of this patent

UNITED STATES PATENTS

| | | |
|---|---|---|
| 1,211,735 | Magrath | Jan. 9, 1917 |
| 1,233,016 | Bartlett | July 10, 1917 |
| 2,684,331 | Bauman | July 20, 1954 |
| 2,771,193 | Simpson et al. | Nov. 20, 1956 |
| 2,785,179 | Julsingha | Mar. 12, 1957 |
| 2,785,180 | Julsingha | Mar. 12, 1957 |
| 2,891,071 | Aspergren | June 16, 1959 |
| 2,894,954 | De Witt et al. | July 14, 1959 |
| 2,937,199 | Donahue | May 17, 1960 |